M. A. GREEN.
Combined Milking-Pails and Stools.
No. 132,720. Patented Nov. 5, 1872.
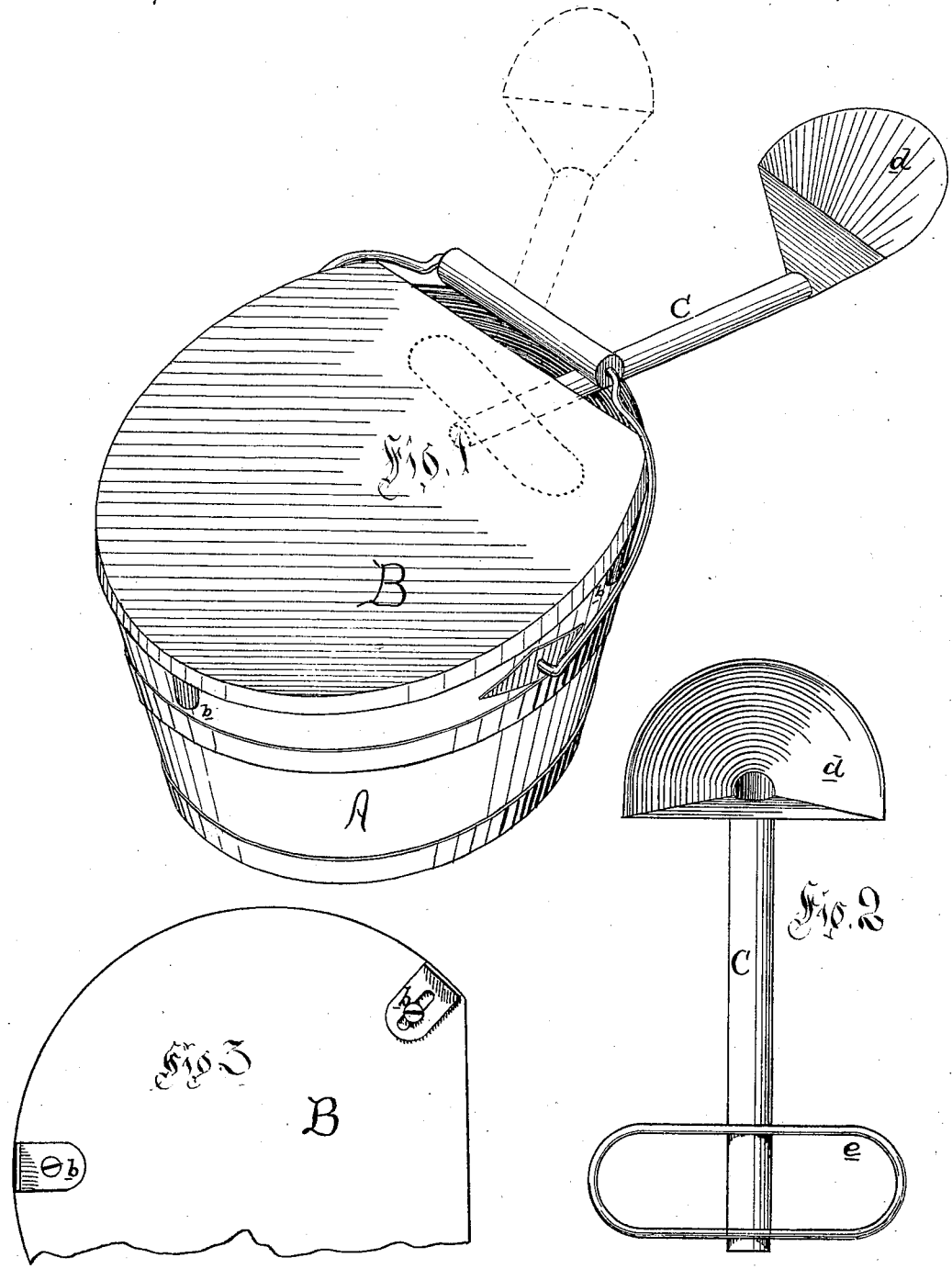

UNITED STATES PATENT OFFICE.

MOSES A. GREEN, OF FITCHBURG, MASSACHUSETTS.

IMPROVEMENT IN COMBINED MILKING PAILS AND STOOLS.

Specification forming part of Letters Patent No. 132,720, dated November 5, 1872.

*To all whom it may concern:*

Be it known that I, MOSES A. GREEN, of Fitchburg, in the county of Worcester and State of Massachusetts, have invented a new and useful Improved Combined Milking Stool and Pail; and I do hereby declare the following to be a full, clear, and exact description of the same, reference being had to the accompanying drawing, in which—

Figure 1 is a perspective view of my invention. Figs. 2 and 3 show parts of the same detached.

The object of my invention is to obviate the danger of upsetting the milk-pail by an unruly cow; and it consists in combining with a covered pail, which may also serve as a stool for the milker, a detachable cup and spout to receive and conduct the milk to the pail.

That others may fully understand my invention, I will particularly describe it.

A is an ordinary pail provided with a stout cover, B. In order to keep the cover B securely in place it may be provided with stops of any suitable description; but I propose to provide said covers with metallic stops $b$, arranged to project down the outer side of said pail, as shown in Fig. 1. Two or more of said stops $b$ may be slotted, so that they may be adjusted to fit any pail on which it may be desired to use this cover. This manner of construction is, however, more a matter of convenience for the trade than a necessity of the case. The cover B enables the milker to sit upon the pail while milking, and there is, therefore, very little danger that the milk will be spilled by a fractious cow. A spout, C, of sufficient length to reach from the pail, when conveniently placed as a stool, to a point under the teats of the cow which is being milked, is provided with a cup, $d$, at one end and a cross-piece, $e$, at the other, whereby, when the end of said spout which is provided with said cross-piece is inserted beneath the cover B, the cup $d$ is kept upright and may be readily adjusted properly beneath the teats to receive the milk and conduct it to the pail. To make the insertion and adjustment of the spout C convenient I cut away a portion of one edge of the cover B so as to expose the edge of the pail, as shown in Figs. 1 and 3. The spout may then be adjusted in or out, or sidewise, as shown by dotted lines in Fig. 1, as may be desired.

If desired, the portion of the pail exposed by cutting away a portion of the cover, as described, may be covered by a flap of flexible material so as to prevent the accidental entrance of dirt or other objectionable matter.

Having described my invention, what I claim as new is—

In combination with the common pail A and loose cover B, the detachable loose spout C provided with cup $d$ and cross-bar $e$, substantially as and for the purpose set forth.

MOSES A. GREEN.

Witnesses:
    I. B. PROCTOR,
    J. L. BUTMAN.